United States Patent
Van Der Sluis et al.

(10) Patent No.: US 8,640,646 B2
(45) Date of Patent: Feb. 4, 2014

(54) ROBOT AND METHOD FOR MILKING A COW BY THIS ROBOT

(75) Inventors: Peter Willem Van Der Sluis, Ijsselmuiden (NL); Hendrik Hofman, Lemmer (NL)

(73) Assignee: Technologies Holding Corporation, Houston, TX (US)

( * ) Notice: Subject to any disclaimer, the term of this patent is extended or adjusted under 35 U.S.C. 154(b) by 0 days.

(21) Appl. No.: 13/260,730

(22) PCT Filed: Mar. 25, 2010

(86) PCT No.: PCT/NL2010/050154
§ 371 (c)(1),
(2), (4) Date: Nov. 23, 2011

(87) PCT Pub. No.: WO2010/110663
PCT Pub. Date: Sep. 30, 2010

(65) Prior Publication Data
US 2012/0055408 A1    Mar. 8, 2012

(30) Foreign Application Priority Data
Mar. 27, 2009    (NL) ...................................... 2002678

(51) Int. Cl.
*A01J 5/017*    (2006.01)

(52) U.S. Cl.
USPC ........................................................ 119/14.08

(58) Field of Classification Search
USPC .......... 119/14.08, 14.01, 14.02, 14.03, 14.04, 119/14.05, 14.11, 14.18, 14.54, 520, 14.45
See application file for complete search history.

(56) References Cited

U.S. PATENT DOCUMENTS

| | | | | |
|---|---|---|---|---|
| 4,508,058 A | * | 4/1985 | Jakobson et al. | 119/14.02 |
| 5,842,436 A | * | 12/1998 | van der Lely | 119/14.08 |
| 8,205,573 B2 | * | 6/2012 | Eriksson et al. | 119/14.02 |
| 2010/0095893 A1 | * | 4/2010 | Kallen et al. | 119/14.04 |
| 2011/0061596 A1 | * | 3/2011 | Nilsson et al. | 119/14.08 |
| 2012/0000427 A1 | * | 1/2012 | Nilsson | 119/14.02 |
| 2012/0103266 A1 | * | 5/2012 | Nilsson | 119/14.02 |
| 2012/0298043 A1 | * | 11/2012 | Birk et al. | 119/14.04 |

FOREIGN PATENT DOCUMENTS

| | | |
|---|---|---|
| EP | 2060170 A1 | 5/2009 |
| WO | 9737530 | 10/1997 |
| WO | 9835547 | 8/1998 |
| WO | 0013492 | 3/2000 |
| WO | 2007142586 A1 | 12/2007 |
| WO | 2008118068 A1 | 10/2008 |
| WO | 2010014002 A1 | 2/2010 |

OTHER PUBLICATIONS

International Search Report and Written Opinion of the Patent Cooperation Treaty Office in foreign counterpart Application No. PCT/NL2010/050154, dated Jul. 5, 2010.

* cited by examiner

*Primary Examiner* — T. Nguyen
(74) *Attorney, Agent, or Firm* — Baker Botts L.L.P.

(57) ABSTRACT

The present invention relates to a robot (6) for moving a milking cup or milking cups (7) from a first resting position to a second operational position or vice versa, in which second position it connects to a cows' teat or teats for collecting milk, wherein it comprises a frame (9), which frame supports a movable arm (10) that has a free extremity (11) at which it is provided with a gripper or grippers (12) for the milking cup or cups (7).

9 Claims, 7 Drawing Sheets

ROBOT AND METHOD FOR MILKING A COW BY THIS ROBOT

The invention relates to a robot for moving a milking cup or milking cups from a first resting position to a second operational position or vice versa, in which second position it connects to cow's teat or teats for collecting milk.

Accordingly the invention also relates to a method for milking a cow, by using a robot for automatically handling milking cups that are near to the cow, wherein the robot handles the milking cups between a first resting position and a second operational position in which the milking cups connect to the cow's teats for collecting milk.

A robot in accordance with the preamble is known from European patent application EP-A-1 447 002. This prior art document generally shows that it is known to use a robot for placing milking cups by collecting the milking cups from a milking rack and subsequently place them on the teats of a cow for collecting milk.

In the prior art the cow stands still in a so called milking box in which the movements of the cow are limited by fences. In such a position it is relatively easy to place the milking cups on the teats. The production rate of this known system is, however, relatively low in view of the fact that it is only possible to milk one cow at a time.

In order to increase the production rate it is also known to employ milking robots which are capable of dealing with the partly simultaneous milking of fifty to sixty cows.

An other prior art system that is known employs a rotor on which the cows are placed and on which the cows are milked in a preselected time frame. In this known system a disadvantage is, however, that the milking cups are placed manually. Due thereto in this system with a cow's rotor, the milking of cows is still quite laborious.

It is an object of the invention to provide a robot for milking cows which is particularly suited for use in conjunction with a cow's rotor, albeit that it is also an object of the invention to provide such a robot which may be used in any situation in which automated milking of cows is intended.

In a first aspect of the invention in which the robot is used in conjunction with a cow's rotor, the rotor is provided with a position indicator and the robot is connected or connectable to said position indicator and is arranged for moving at the cow-rotor's circumference so as to maintain for a time-period that depends on the rotational speed of the cow-rotor, a stationary position relative to a preselected part of the moving cow-rotor.

A practical way of implementing such a robot is that it is provided with a frame that is movable along a guide track at the cow rotor's circumference.

This latter aspect makes the robot of the invention particularly suitable to implement a method for automatically milking cows, wherein the robot handles the milking cups between a first resting position and a second operational position in which the milking cups connect to the cow's teats for collecting milk, and in which movement of the milking cups between the first position and the second position is done through an area located between the cows hind-legs. Accordingly the robot of the invention can be applied in conjunction with various types of cow rotors, without having any appreciable design restrictions as to the type of rotor that is used for moving the cows. The only requirement is that the robot is designed so as to be able to move the milking cups between the hind-legs of the cow and place them on the corresponding teats of the cow, and likewise to remove the milking cups after the milking operation from the teats of the cow and place them back into the receptacles of the milking cups.

In order to meet the different practical objectives that the robot preferably has to meet, it is advantageously designed in accordance with one or more of the appended claims 1-12.

One of the further aspects of the robot of the invention is that it comprises a frame, which frame supports a movable arm that has a free extremity at which it is provided with a gripper or grippers for the milking cup or cups. Each of the grippers can thus individually deal with the handling of a milking cup which has certain benefits which will become apparent hereinafter.

In accordance therewith it is preferable that the robot comprises four grippers that are individually controllable for selective operation of each of the grippers.

The robot of the invention is suitably embodied such that it is arranged for cooperation with a cow-rotor that is equipped to receive multiple cows, and which cow-rotor has for each cow it receives a rack for keeping milking cups in their first resting position. Thus every time that a cow on the rotor comes in front of the robot, the robot deals with this cow by getting the milking cups from the rack close to the concerning cow and place them on said cow's teats.

In order to secure a reliable operation of the robot of the invention it is desirable that the movable arm has at its free extremity one or more sensors for detecting the teat or teats of a cow, and that a controller is provided to which the sensor or sensors and the gripper or grippers are connected so as to have the gripper or grippers respond to the presence of the teat or teats as measured by the sensor or sensors.

A further desirable feature is that the gripper or grippers are mounted on a support at the movable arm's free extremity, and that said gripper or grippers are extendible from the support in the arm's longitudinal direction. This allows that the grippers can be moved from behind the cow and through the area located between the cow's hind-legs in the direction of the teats of the cow. This saves on space at the side of the cow, which is the usual location from which the placement of the milking cups on the teats of the cow is carried out.

It is further preferred to support the ease of placement of the milking cups on the cow's teats by having the gripper or grippers swivably mounted on a support at the movable arm's free extremity, so as to be able to swivel each gripper between a first position parallel to the arm's longitudinal direction and a second position at which the gripper extends sideways in a horizontal plane obliquely away from the arm's longitudinal direction. This feature secures that once the grippers are moved through the area between the cow's hind-legs, said grippers can move the milking cups further sideways in the direction of the cow's teats and place them thereon.

A very beneficial feature of the robot of the invention is that each gripper comprises cooperating fingers for gripping a milking cup, and clamping means for pinching off and holding a milking hose that connects to the milking cup. This embodiment secures that once the gripper or grippers catch the milking cups, the corresponding milking hoses of the milking cups are pinched off simultaneously. This results in an effective vacuum condition in the milking hose immediately below the milking cup to which the concerning milking hose connects, due to the low-pressure in said hose which is needed for the milking operation.

It is then further preferred that the cooperating fingers and the clamping means when activated operate simultaneously or concurrently. This provides that when in the second position of the milking cup or cups the grippers release said milking cups, the clamping means also release the milking hose or hoses connected to these milking cup or cups thus securing an immediate and tight connection with the cow's teats.

The invention will hereinafter be further elucidated with reference to a preferred embodiment of the robot and its use in connection with a cow's rotor, and with reference to the drawing.

In the drawing.

Wherever in the figures the same reference numerals are applied these numerals refer to the same parts.

Figure 1:
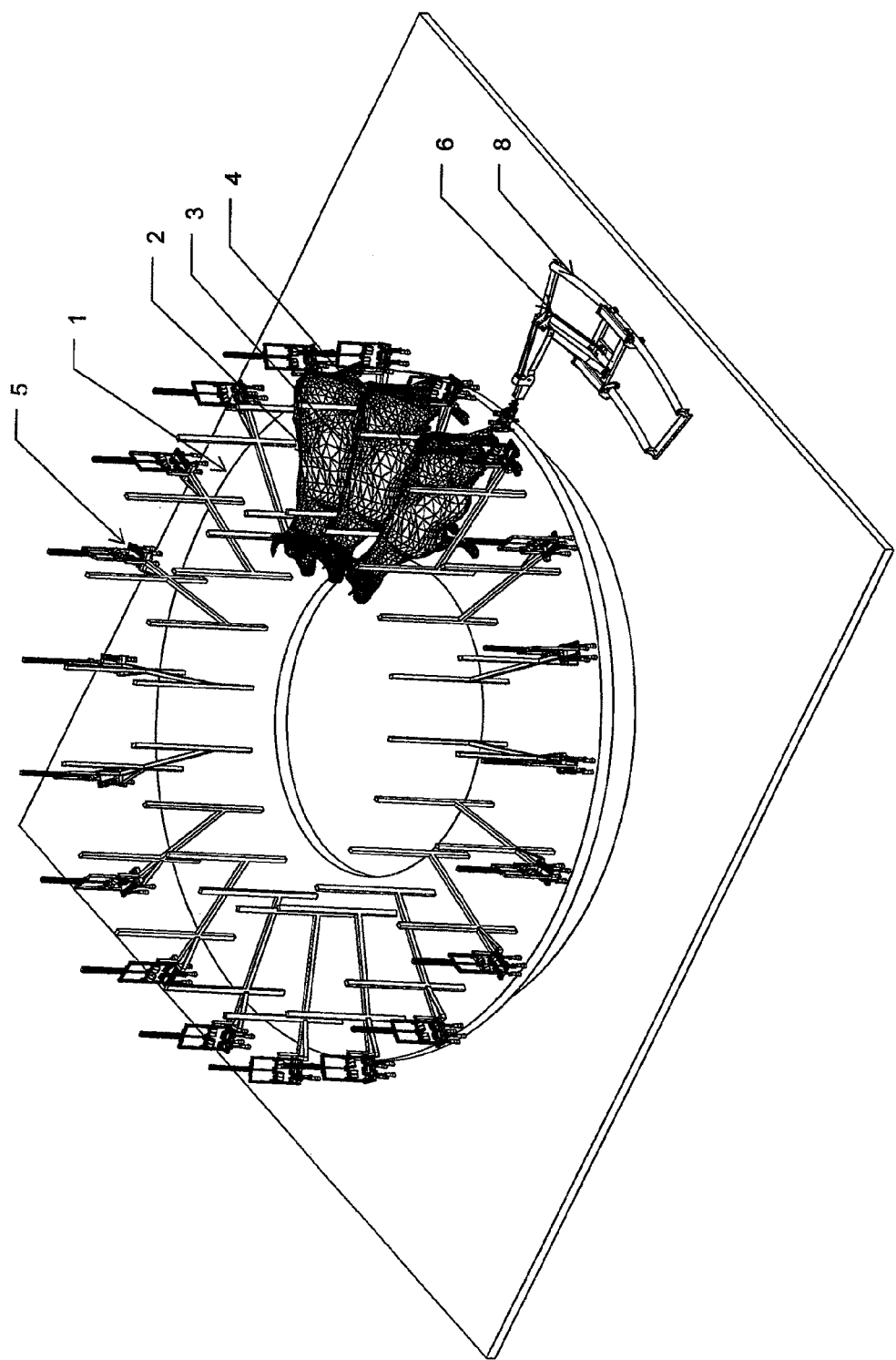
FIG. 1 shows the robot of the invention used in conjunction with a cow's rotor.

With reference first to FIG. 1 schematically a cow's rotor 1 is shown carrying some cows 2, 3, 4.

The rotor 1 can carry a series of cows 2, 3, 4 at multiple circumferentially provided positions, whereby with each position there is also a milking rack 5 at which the milking cups may occupy their first resting position. The robot 6 is arranged to take the milking cups from the milking rack and move them in a second operational position in which the milking cups are connected to the teats of a cow 2, 3, 4 which has to be milked.

Figure 2:
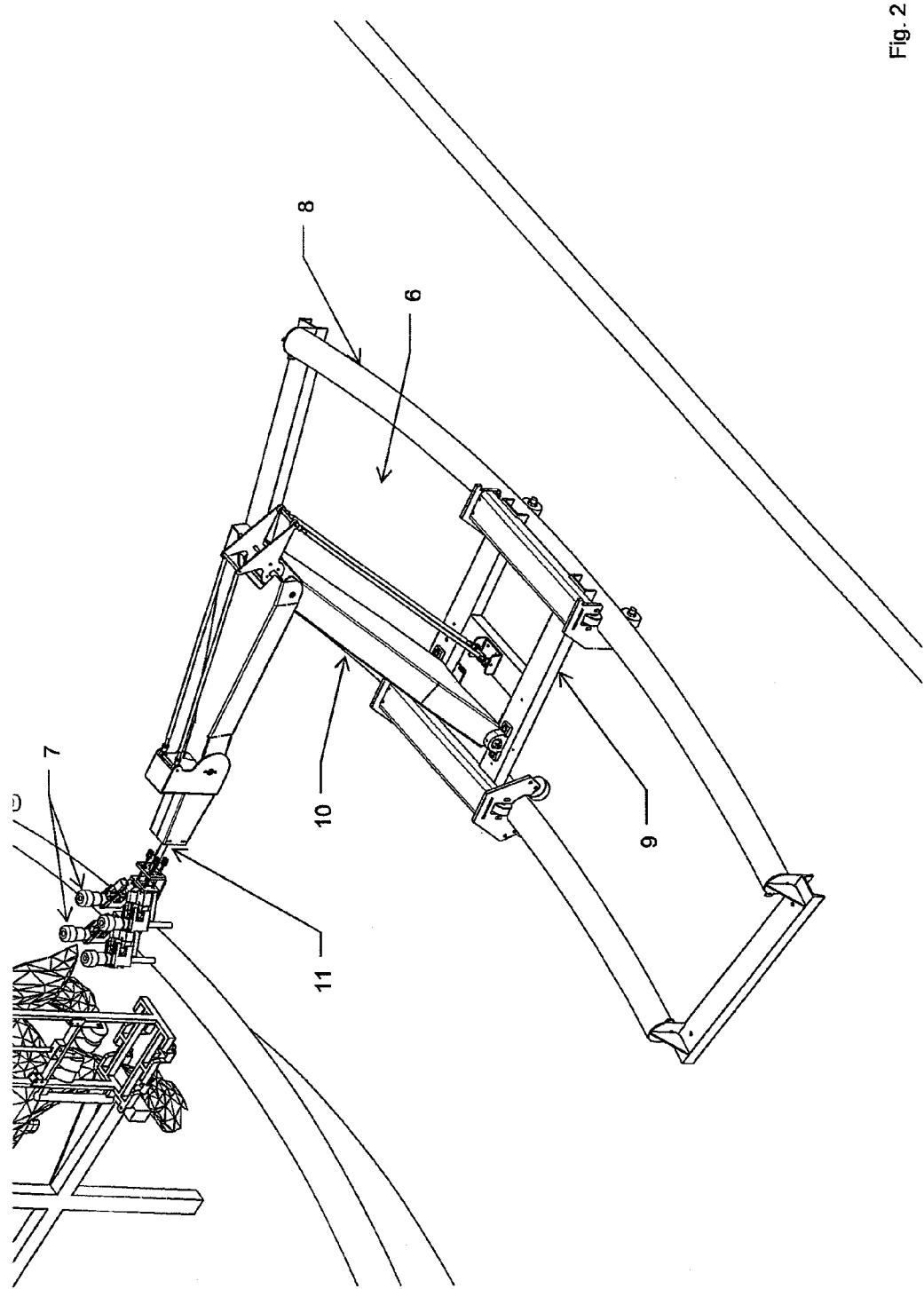
FIG. 2 shows the robot of the invention in a detail of FIG. 1.

FIG. 2 shows the robot 6 in more detail in a situation in which it has moved the milking cups 7 already from their first resting position, and prior to having the milking cups 7 placed in the second position.

FIG. 2 further shows that the robot 6 is movable along a guide track 8 which is at the circumference of the rotatable cow rotor 1 such that it can move concurrent with the movement of the cow rotor 1. In that way the robot 6 can for a certain time period corresponding with the length of the guide track 8 and that depends on the rotational speed of the cow rotor, maintain a stationary position relative to a preselected part of the moving cow rotor 1. This is particularly relevant for the part where the cow 2, 3, 4 is located which has to be connected to the milking cups 7 that are taken from the rack close to the concerning cow.

FIG. 2 shows that the robot 6 comprises a frame 9 which supports a movable arm 10 which has at its free extremity 11 four grippers for handling the milking cups 7. Each of said grippers 7 is individually controllable for selectively operating on the concerning milking cups 7 and for the individual handling of each of said milking cups 7.

Figure 3:
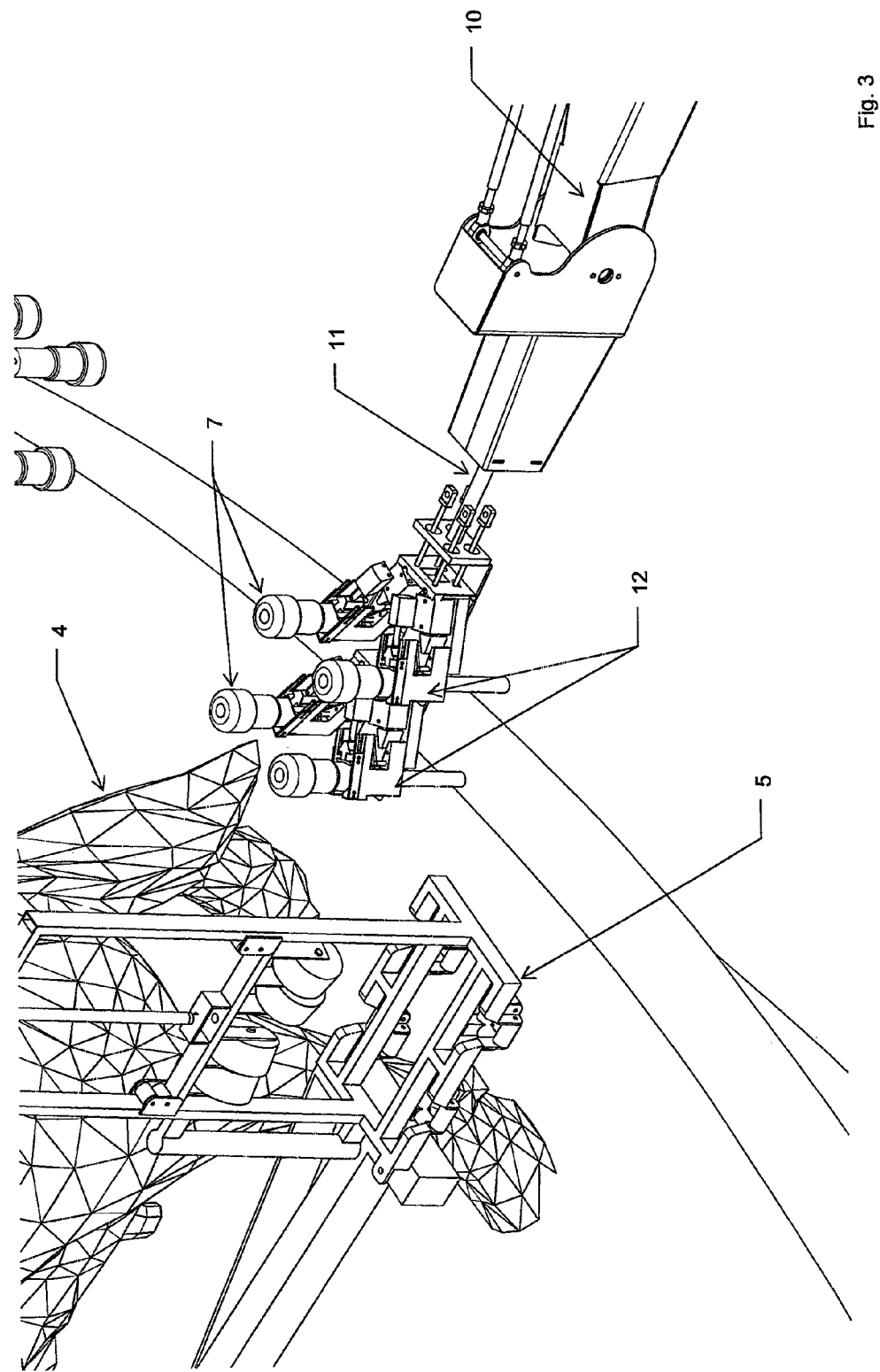
FIG. 3 shows a part of the robot of the invention close to a milking rack in which the milking cups have their resting position.

In FIG. 3 a detailed view is offered of the free extremity 11 of the robot arm 10 as well as of the milking cups 7 that are taken from the milking rack 5 and are held by the grippers 12 of the robot immediately prior to placing them on the teats of a cow 4.

Figure 4:
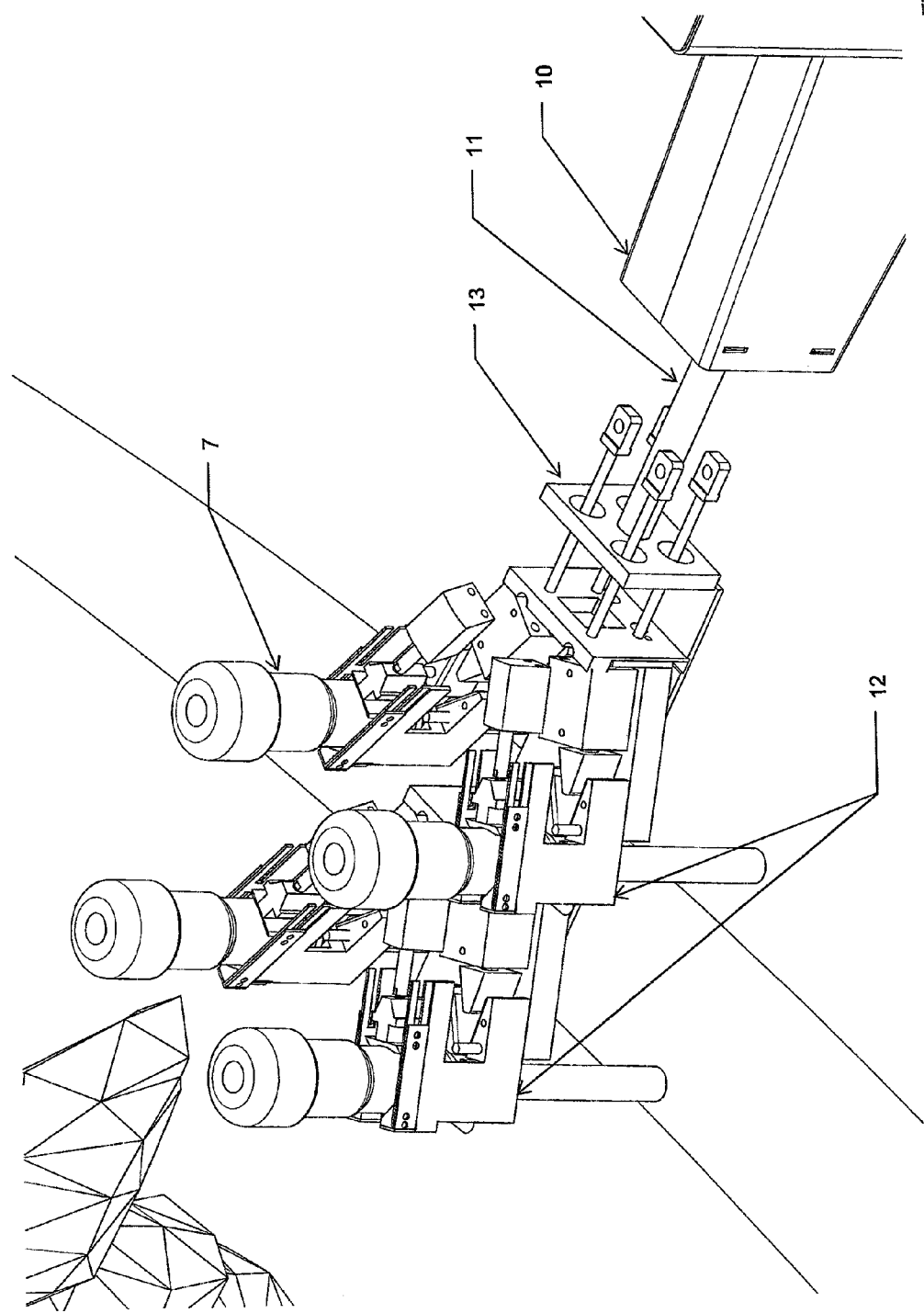
FIG. 4 shows a detail of the robot with the milking cups shown in FIG. 3.

FIG. 4 shows even a further detailed view of the free extremity 11 of the robot arm 10 as well as the milking cups 7 as held by the grippers 12.

It is to be noted that the movable arm 10 has at its free extremity 11 one or more sensors for detecting the teat of teats of a cow and that a controller is provided to which the sensor or sensors and the gripper of grippers 12 are connected such so as to have the gripper or grippers 12 respond to the position of the teat or teats as measured by the sensors. The manner in which this can be implemented is clear for the person skilled in the art, so a further discussion and detailed view in the figures with a corresponding description can be dispensed with.

Figure 5:
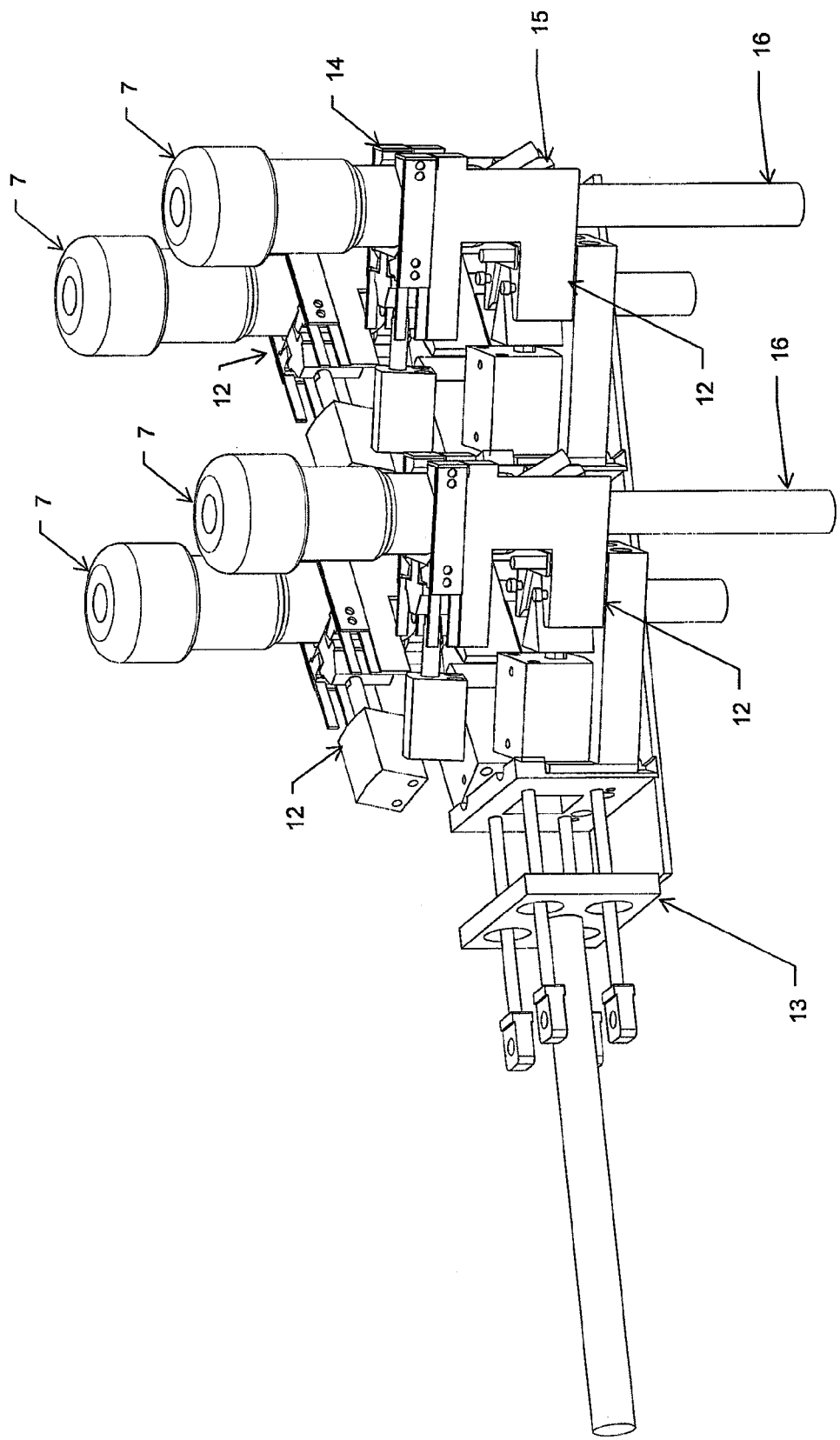
FIG. 5 shows the grippers of the robot with the milking cups.

In FIG. 5 it is more clearly shown that the gripper or grippers 12 are mounted on a support 13 at the movable arm's 10 free extremity 11 (see also FIG. 4) and that said gripper or grippers 12 are extendable from the support 13 in the longitudinal direction of the arm 10.

Figure 6:
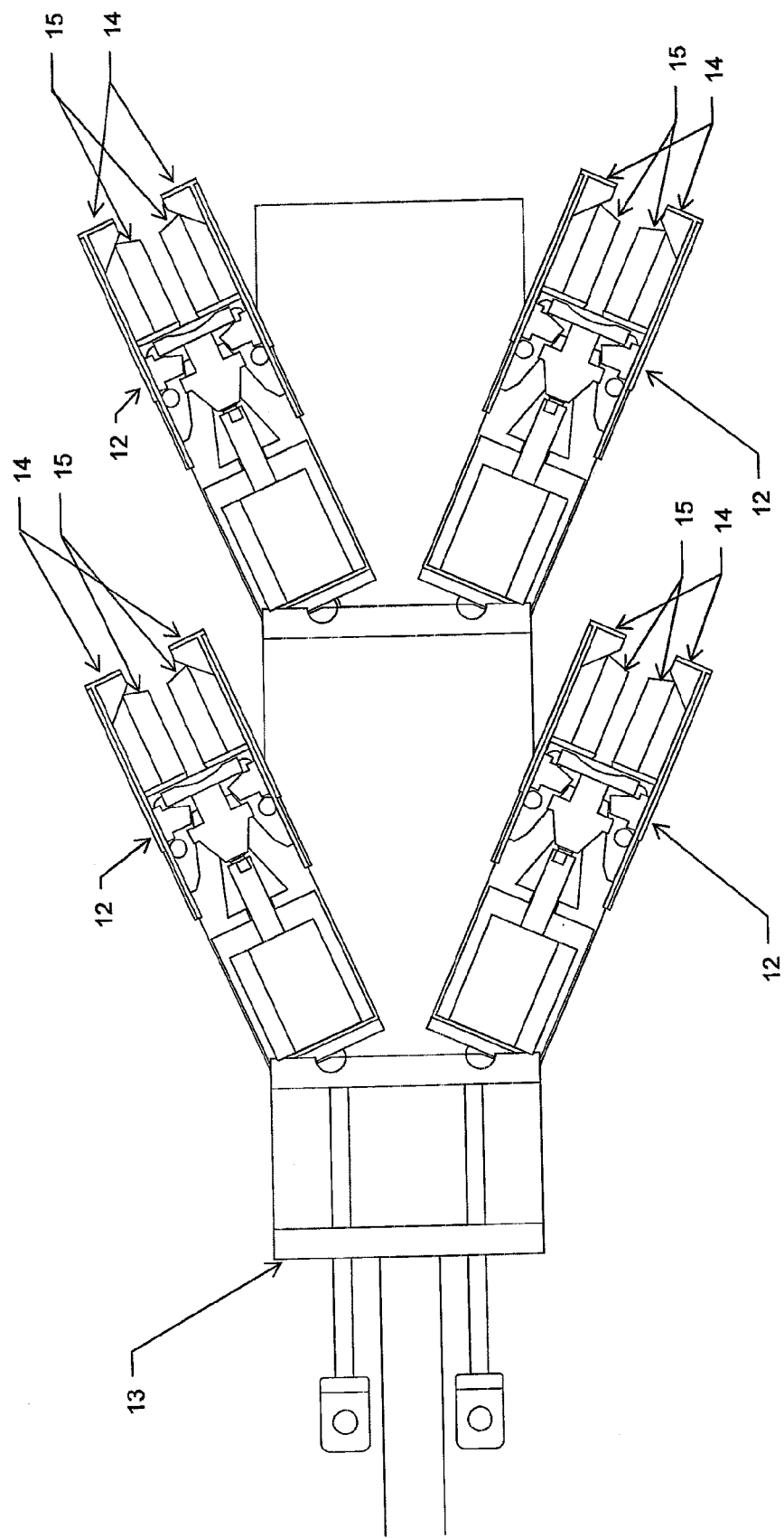
FIG. 6 shows a detail of the robot having the grippers for the milking cups in a sideways extending position.
Figure 7:
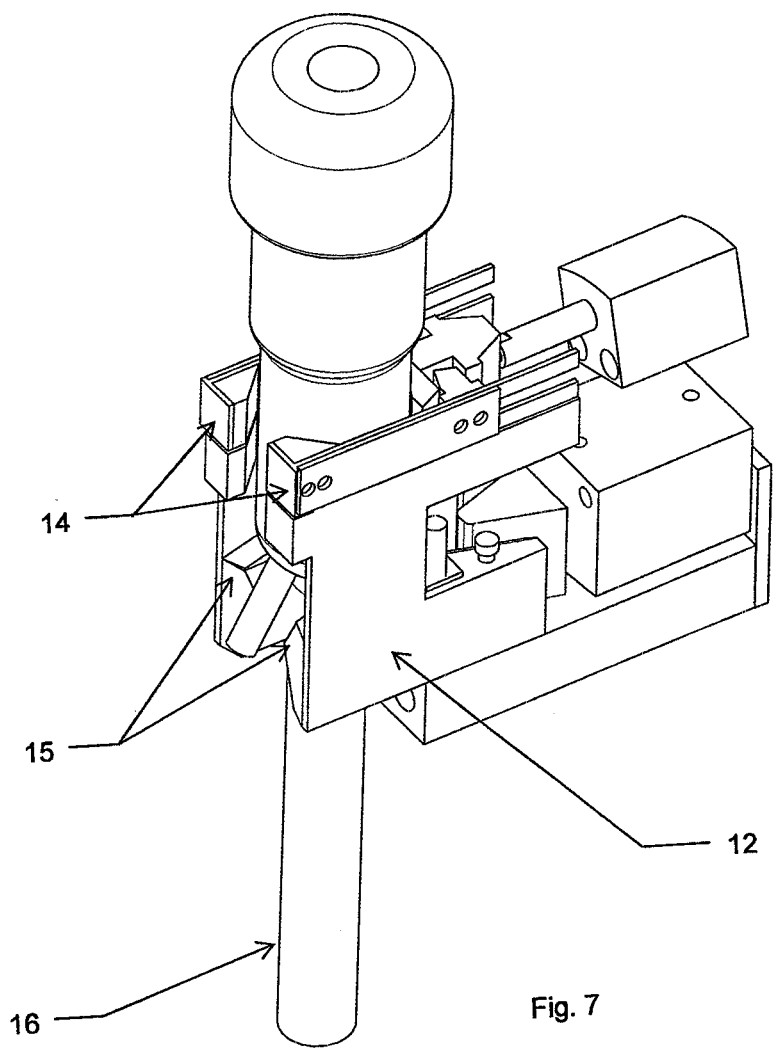
FIG. 7 shows a single gripper of the robot of the invention holding a milking cup.

Further FIG. 5 and more even so FIG. 6 show that the grippers 12 are swivably mounted on the support 13 that is placed at the free extremity 11 of the movable arm 10. By this feature it is possible to swivel each gripper 12 between a first position that is parallel to the arm's longitudinal direction and which facilitates the movement of the grippers 12 with the milking cups 7 through the area in between the cow's hindlegs, and a second position as shown in FIG. 6 at which the grippers 12 extend sideways in a horizontal plane obliquely away from the arm's longitudinal direction. This latter position best suits the placement of the milking cups 7 on the teats of the cow.

FIG. 5 and FIG. 6 further show that each gripper 12 comprises cooperating fingers 14 for gripping a milking cup 7, as well as clamping means 15 (as best seen in FIG. 6) that serve for pinching off the hoses 16, as well as for holding said milking hoses 16 that connect to the milking cups 7. Thus the clamping means 15 serve a dual purpose, the first being to have an immediately available vacuum pressure available in the milking cup 7 once the clamping means 15 release the milking hoses 16. This facilitates a quick and effective connecting of the milking cups 7 to the teats of the cow. A further purpose is that during the holding of the milking hoses 16 by the clamping means 15, the milking cups 7 are effectively prevented from slipping from their position as held by the cooperating fingers 14 of the grippers 12, when the milking cups 7 are not yet connected to the teats of the cow.

In order to attain the just mentioned advantage of a quick and effective placement of the milking cup 7 to the teats of the cow it is further preferred that in the second position of the milking cups, when they are placed on the teats of the cow, the grippers 12 release the milking cups 7 and the clamping means 15 concurrently release the milking hoses 16 connected to said milking cups 7.

It is expressly remarked that with the above given description with reference to the figures of the drawing, a preferred embodiment of the robot of the invention and several of its aspects are offered without intention, however, to limit the scope of protection of the appended claims to merely the discussed embodiment. The example with reference to this preferred embodiment only serves to elucidate the terms of the claims, however, the invention and the scope of protection that it merits is only determined by the appended claims.

The invention claimed is:

1. Robot for moving a milking cup or milking cups from a first resting position to a second operational position or vice versa, in which second position it connects to a cows' teat or teats for collecting milk, which comprises a frame that supports a movable arm that has a free extremity at which it is provided with a gripper or grippers for the milking cup or cups, wherein:

each gripper comprises cooperating fingers for gripping a milking cup, and clamping apparatus for pinching off and holding a milking hose that connects to the milking cup, wherein the cooperating fingers and the clamping apparatus in use operate in concert so that in the second position of the milking cup or cups the grippers release said milking cup or cups and the clamping apparatus releases the milking hose or hoses connected to the milking cup or cups.

2. Robot according to claim 1, comprising four grippers that are individually controllable for selective operation of each of the grippers.

3. Robot according to claim 1, arranged for cooperation with a cow-rotor that is equipped to receive multiple cows, and which cow-rotor has for each cow it receives a rack for keeping milking cups in their first resting position.

4. Robot according to claim 3, arranged for moving at the cow-rotor's circumference so as to maintain for a time-period depending on the cow rotors rotational speed a stationary position relative to a preselected part of the moving cow-rotor.

5. Robot according to claim 1, wherein the frame is movable along a guide-track.

6. Robot according to claim 1, wherein the movable arm has at its free extremity one or more sensors for detecting the teat or teats of a cow, and a controller is provided to which the sensor or sensors and the gripper or grippers are connected so that the gripper or grippers respond to the sensor or sensors.

7. Robot according to claim 1, wherein the gripper or grippers are mounted on a support at the movable arm's free extremity, and said gripper or grippers are extendible from the support in the arm's longitudinal direction.

8. Robot according to claim 1, wherein the gripper or grippers are swivably mounted on a support at the movable arm's free extremity so as to be able to swivel each gripper between a first position, parallel to the arm's longitudinal direction, and a second position at which the gripper extends sideways in a horizontal plane obliquely away from the arms longitudinal direction.

9. Robot according to claim 1, arranged for cooperation with a cow's rotor, which rotor is provided with a position-indicator, the robot being connected or connectable to said position-indicator and being arranged for moving at the cow-rotor's circumference so as to maintain for a time-period that depends on the cow-rotor's rotational speed a stationary position relative to a preselected part of the moving cow-rotor.

* * * * *